US008355931B1

(12) United States Patent  (10) Patent No.: US 8,355,931 B1
Easley                          (45) Date of Patent:    Jan. 15, 2013

(54) MORTALITY PROGRESSION METHODS AND SYSTEMS

(75) Inventor: Matthew S. Easley, Arlington Heights, IL (US)

(73) Assignee: Allstate Insurance Company, Northbrook, IL (US)

( * ) Notice: Subject to any disclaimer, the term of this patent is extended or adjusted under 35 U.S.C. 154(b) by 485 days.

(21) Appl. No.: 12/482,032

(22) Filed: Jun. 10, 2009

Related U.S. Application Data

(60) Provisional application No. 61/060,499, filed on Jun. 11, 2008.

(51) Int. Cl.
*G06Q 40/00* (2012.01)
(52) U.S. Cl. ............... 705/4; 705/36 R; 705/35; 705/38; 705/1.1
(58) Field of Classification Search .................... 705/1.1, 705/4, 36 R, 35, 38, 2, 7.28, 14, 30, 37; 514/635, 514/331; 436/501
See application file for complete search history.

(56) References Cited

U.S. PATENT DOCUMENTS 7,640,202 B2 * 12/2009 Foti et al. ..................... 705/36 R
2003/0236685 A1 * 12/2003 Buckner et al. ................... 705/4

OTHER PUBLICATIONS

Lin, X. Sheldon, and Liu, Xiaoming, "Markov Aging Process and Phase-Type Law of Mortality". North American Actuarial Journal, Oct. 2007, p. 92.*
Newton L Bowers, Jr, Hans, U Gerber, James C. Hickman, Donald A Jones, and Cicil J Nesbitt, "Actuarial Mathematics", published by the Society of Actuaries in 1986. Chapter 3 discussion of survival distributions and life tables.
Chester Wallace Jordan, "Society of Actuaries' Textbook on Life Contingencies" published by the Society of Actuaries in 1975. Chapter 1, section 8 discussion of select mortality tables.
Balls, Kim G., "Immediate Annuity Pricing in the Presence of Unobserved Heterogeneity", North American Actuarial Journal, Oct. 2006, p. 103.
Lin, X. Sheldon; and Liu, Xiaoming, "Markov Aging Process and Phase-Type Law of Mortality", North American Actuarial Journal, Oct. 2007, p. 92.

* cited by examiner

*Primary Examiner* — John H Holly
(74) *Attorney, Agent, or Firm* — Banner & Witcoff, Ltd.

(57) ABSTRACT

Methods and systems for preparing improved mortality tables for use with life insurance and other financial products are described herein. The improved mortality tables described herein account for progression over time of insureds from one underwriting class to another, e.g., based on deteriorating health over time. An insured who is in a "preferred" class at the time of initial underwriting might not still qualify for "preferred" status in 5 years, or even the next year. By creating a system of linear equations that predict the composition of a group n years after underwriting, insurance (and other financial products) providers can calculate more definite costs for pricing financial products based on the estimated or expected transition from one underwriting class to another.

8 Claims, 8 Drawing Sheets

| Underwriting Class | Duration (years) | | | | | | | | | | | Term Conversion Probability in Year 10 |
|---|---|---|---|---|---|---|---|---|---|---|---|---|
| | 0 | 1 | 2 | 3 | 4 | 5 | 6 | 7 | 8 | 9 | 10 | |
| Preferred Elite | 10000 | 9500 | 9028 | 8582.28 | 8161.233 | 7763.359 | 7387.254 | 7031.607 | 6695.192 | 6376.861 | 6075.542 | 0.01 |
| Preferred | 0 | 300 | 568 | 806.74 | 1018.738 | 1206.31 | 1371.582 | 1516.509 | 1642.886 | 1752.363 | 1846.456 | 0.02 |
| Standard | 0 | 100 | 198 | 293.448 | 385.6926 | 474.9708 | 560.397 | 641.9535 | 719.4814 | 792.8733 | 862.0658 | 0.05 |
| Tbl 2 | 0 | 50 | 99.4 | 148.0475 | 195.8081 | 242.5642 | 288.2136 | 332.6684 | 375.854 | 417.7075 | 458.1774 | 0.2 |
| Tbl 4 | 0 | 30 | 60.65 | 91.8885 | 123.6447 | 155.8412 | 188.3953 | 221.2262 | 254.246 | 287.3717 | 320.5206 | 0.5 |
| Tbl 8 | 0 | 10 | 23.05 | 38.895 | 57.29326 | 78.01554 | 100.8444 | 125.5735 | 152.0073 | 179.9605 | 209.2573 | 0.8 |
| Decline | 0 | 7 | 16.12 | 27.2777 | 40.38225 | 55.33597 | 72.03593 | 90.37533 | 110.2447 | 131.5328 | 154.1281 | 0.9 |
| Dying | 0 | 3 | 3.78 | 4.6433 | 5.583928 | 6.595927 | 7.673396 | 8.810509 | 10.00155 | 11.24092 | 12.52319 | 0 |
| Previously Dead | 0 | 0 | 3 | 6.78 | 11.4233 | 17.00723 | 23.60315 | 31.27655 | 40.08706 | 50.08861 | 61.32953 | 0 |
| | 10000 | 10000 | 10000 | 10000 | | 10000 | 10000 | 10000 | 10000 | 10000 | 10000 | |
| Predicted Select Mortality for PE | | 0.0003 | 0.000378 | 0.000464 | 0.000559 | 0.00066 | 0.000769 | 0.000883 | 0.001003 | 0.001129 | 0.001259 | |

*FIG. 3*

| | PE | P | Std | Tbl 2 | Tbl 4 | Tbl 8 | Decline | Dead | Total |
|---|---|---|---|---|---|---|---|---|---|
| Preferred Elite | 95% | 3% | 1% | 0.50% | 0.30% | 0.10% | 0.07% | 0.03% | 100.00% |
| Preferred | 1.00% | 94.00% | 3.00% | 1.00% | 0.50% | 0.30% | 0.15% | 0.05% | 100.00% |
| Standard | 0.00% | 1.00% | 93.00% | 2.00% | 1.70% | 1.30% | 0.80% | 0.20% | 100.00% |
| Tbl 2 | 0.00% | 0.00% | 2.00% | 92.00% | 2.50% | 2.00% | 1.20% | 0.30% | 100.00% |
| Tbl 4 | 0.00% | 0.00% | 0.00% | 3.00% | 91.00% | 3.00% | 2.60% | 0.40% | 100.00% |
| Tbl 8 | 0.00% | 0.00% | 0.00% | 0.00% | 4.00% | 91.00% | 4.00% | 1.00% | 100.00% |
| Decline | 0.00% | 0.00% | 0.00% | 0.00% | 0.00% | 5.00% | 92.00% | 3.00% | 100.00% |

*FIG. 4*

MORTALITY PROGRESSION METHODS AND SYSTEMS

This application claims priority to provisional U.S. Application Ser. No. 61/060,499, filed Jun. 11, 2008, and having the title "Mortality Progression," herein incorporated by reference.

FIELD OF THE INVENTION

The invention relates generally to computer systems and actuarial science. More specifically, the invention relates to methods and systems that provide enhanced mortality progression tables to more accurately reflects risk groups of those insured with life insurance, thereby 1) enhancing a providers' ability to more accurately determine appropriate pricing and ratings when offering such life insurance, and 2) enhancing the ability of a provider to project the portion of its book of business that is in a current underwriting classification over time.

BACKGROUND OF THE INVENTION

In the insurance industry mortality tables (also known as life tables or actuarial tables) are tables that show, for a person at each age, what the probability is that the person will die before the person's next birthday. Mortality tables are created by looking at large groups of people and determining the probability of people within a group dying within a year. Mortality tables can reflect the probability of surviving any particular year of age, the remaining life expectancy for people of various ages, the proportion of the original birth cohort still alive and estimates of a cohort's longevity characteristics, among other factors.

Historically, mortality tables have been created primarily by age and sex for whole societies, but for insurance purposes mortality tables may be divided by underwriting class. Common naming would split people first between classes of smoking and non-smoking, then between a preferred class, a standard class, a sub-standard class and finally a "decline" class representing people who would not be insured at all. Preferred classes represent people whose health and fitness are above average and would have a better than average expected mortality. Standard classes represent people with average health and builds. Substandard classes represent people with known health problems or other physical problems that would predict a poorer expected mortality. The decline class represents those people having a severe health problem that renders their mortality very high or very unpredictable. Sometimes a "deferred" class is used in place of "decline" for people who are recovering from a problem where a good outcome would make them insurable after a period of time.

Insurance policies are underwritten at policy inception. Underwriting refers to the process that an insurance company uses to determine the eligibility of a customer to receive its products. Insurance underwriters evaluate the risk and exposures of the prospective clients and determine how much coverage the clients should receive, how much they should pay for it, and even if they should insure the client in the first place. Underwriting involves measuring risk exposure and determining the premium necessary to insure that risk.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, the present invention is directed to preparing improved mortality tables for use with life insurance and other financial products. The improved mortality tables described herein account for progression over time of insureds from one underwriting class to another, e.g., based on deteriorating health over time. An insured who is in a "preferred" class at the time of initial underwriting might not still qualify for "preferred" status in 5 years, or even the next year. By creating a different type of mortality table that predicts the composition of a group n years after underwriting, insurance (and other financial products) providers can calculate more definite costs for pricing financial products. The improved mortality tables may be expressed using a system of equations or as individual progression tables for an age-underwriting class combination.

A first aspect of the invention provides a method for generating improved mortality tables by identifying an expected mortality based on an underwriting class for people of a same age that have recently been underwritten for a financial product, and then analyzing actual death claims to identify actual mortality of the people at a predetermined point in the future. Next, the method determines a difference in mortality between the actual mortality at the predetermined point in the future and an expected mortality as if the people were newly underwritten at that predetermined point in the future, where a portion of the people have experienced a deterioration in health since original underwriting such that their mortality will be higher at the predetermined point in the future than would otherwise be expected had their health not deteriorated. The previous steps are for each of a multiple ages, underwriting classes, and for multiple different predetermined points in the future. Once the data has been gathered, a system of equations is created based on the determined differences in mortality, where the system of equations models the expected movement of insureds from one underwriting class to another over time to explain the observed differences in mortality.

In some aspects, the analyzing step may be performed using an existing select and ultimate mortality table to obtain the actual mortality of the people at the predetermined point in the future. According to other aspects described herein, the weighted average of mortality based on the progression table approximates the actual observed mortality for an age-underwriting class combination. In addition, a separate progression table may be generated for each combination of age and underwriting class based on the system of equations.

The systems and methods described herein may be used with a variety of financial products, including but not limited to individual life insurance, group life insurance, accident insurance, disability insurance, long term care insurance, annuitant groups, and morbidity analysis.

The improved mortality tables and progression tables may be used by financial products provider to the calculate costs for a term conversion life insurance product, a guaranteed issue life insurance policy, a cost based on a lapse rate, and a cost associated with a guaranteed insurability option rider, to name a few.

Another aspect described herein provides methods and systems, including computer memory devices storing computer executable instructions that, when executed by a processor, cause a computer to perform the described methods, for performing a cost analysis by determining an original distribution of mortality for each of a plurality of underwriting classes of a plurality of people underwritten for a financial product, and projecting a future distribution of mortality corresponding to each original distribution based on a predetermined set of progression tables that model an expected movement of insureds from one underwriting class to another over time. Once the future distributions are projected, they are analyzed to predict a percentage of insureds in each underwriting class likely to accept a product offering associated with the financial product, and then a cost for the product offering is generated based on the predicted percentages of insureds in each underwriting class likely to accept the product offering.

The financial product may be a life insurance product, and the product offering may be a guaranteed insurability option rider or a term conversion of the life insurance, among other products and offerings.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 3 illustrates a sample mortality table created according to one or more illustrative aspects of the invention.

FIG. 4 illustrates a sample transition table created according to one or more illustrative aspects of the invention.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
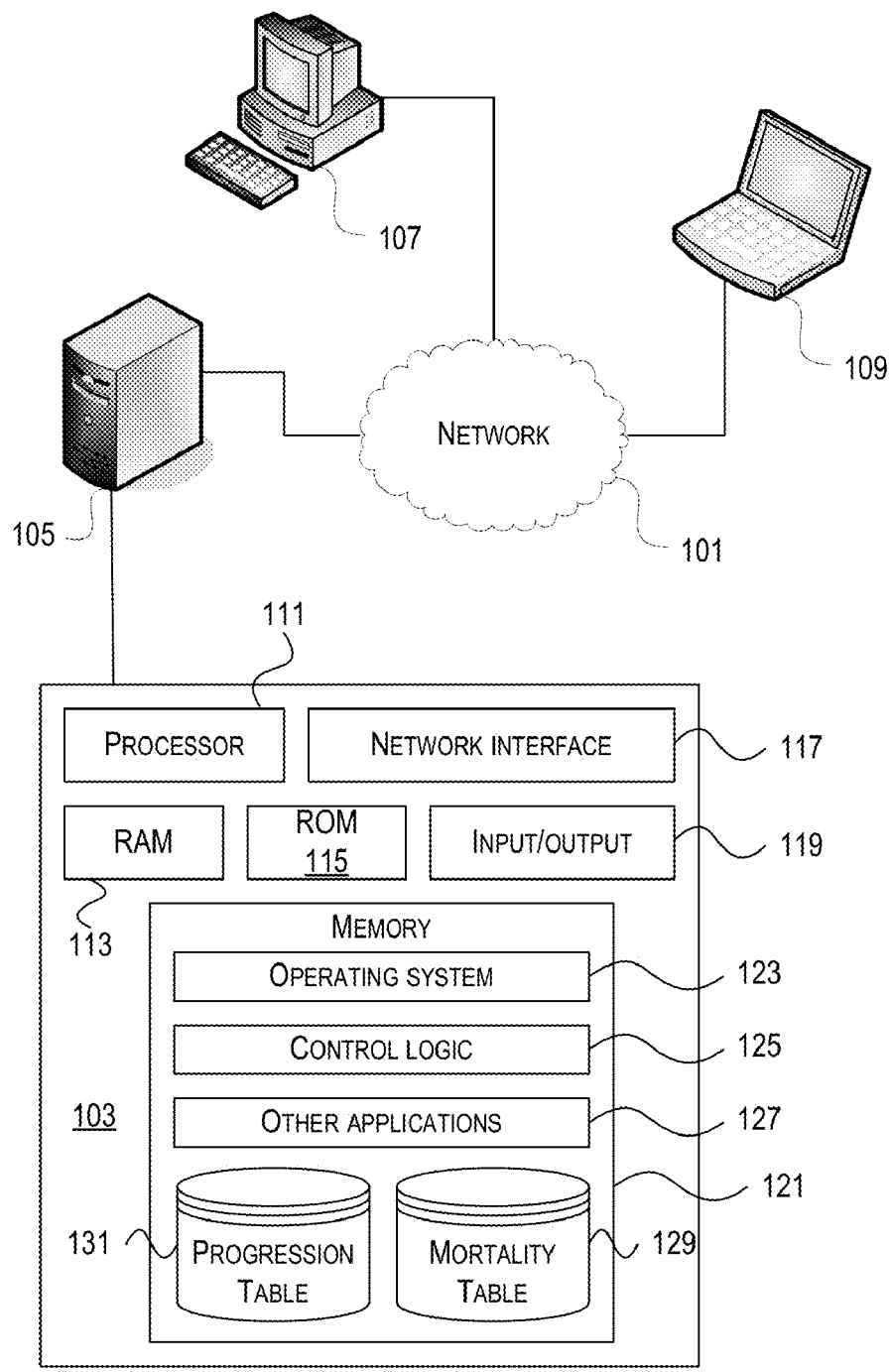
FIG. 1 illustrates a computer and network architecture that may be used according to one or more illustrative aspects of the invention.

Aspects of the invention may be implemented in data processing systems, either alone or in combination with other data processing systems interconnected via one or more networks, e.g., as illustrated in FIG. 1. FIG. 1 illustrates one example of a network architecture and data processing device that may be used to implement one or more illustrative aspects of the invention. Various components 103, 105, 107, and 109 may be interconnected via a network 101, such as the Internet. Other networks may also or alternatively be used, including private intranets, LANs, WANs, PANs, SANs, and the like. The components may include an insurance rate server 103, web server 105, and client computers 107, 109. Rate server 103 provides overall control and administration of providing improved mortality rates to users (e.g., insurance underwriters, actuaries, etc.) according to aspects described herein.

Rate server 103 may be connected to web server 105 through which users interact with and obtain mortality data and/or rates. Alternatively, rate server 103 may act as a web server itself and be directly connected to the Internet or other network. Rate server 103 may be connected to web server 105 through the network 101 (e.g., the Internet), or via some other network (not shown). Users may interact with the rate server 103 using remote computers 107, 109, e.g., using a web browser to connect to the rate server 103 via one or more web sites hosted by web server 105. Alternatively, remote computers 107, 109 may interact directly with rate server 103 using special applications, e.g., in a client-server arrangement. Servers and applications may be combined on the same physical machines, and retain separate virtual or logical addresses, or may reside on separate physical machines. FIG. 1 illustrates but one example of a network architecture that may be used. The specific network architecture and date processing device used may vary, and are secondary to the functionality that they provide, as described herein.

Each component 103, 105, 107, 109 may be any type of known computer, server, or data processing device. Rate server 103, e.g., may include a processor 111 controlling overall operation of the rate server 103. Rate server 103 may further include RAM 113, ROM 115, network interface 117, input/output interfaces 119 (e.g., keyboard, mouse, display, printer, etc.), and memory 121. Memory 121 may further store operating system software 123 for controlling overall operation of the data processing device 103, control logic 125 for instructing rate server 103 to perform aspects of the invention as described herein, and other application software 127 providing secondary, support or other functionality which may or may not be used in conjunction with aspects of the present invention. The control logic may be referred to herein as the rate server software 125. Functionality of the rate server software may refer to operations or decisions made automatically based on rules coded into the control logic, or made manually by a user providing input into the system. Memory 121 may also store data used in performance of one or more aspects of the invention, including mortality table data 129 and progression table data 131.

The functionality of data processing device 103 as described herein may be spread across multiple data processing devices, for example, to distribute processing load across multiple computers, to segregate transactions based on geographic location, insurer, insured, type of insurance, etc. In addition, one or more aspects of the invention may be embodied in computer-usable data and computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

The impact of underwriting fades over time. A person who is underwritten today and classified preferred has a better expected mortality than a person who was underwritten three years ago and classified preferred at that time. This is captured by select and ultimate mortality tables that predict that a group of people who are underwritten (with the substandard lives excluded) will gradually experience higher mortality, getting closer and closer to the population mortality over time. This grading off of the underwriting effect typically happens over a 15+ year period of time. Other embodiments or aspects may use different mortality levels or ranges other than or in addition to "select" and "ultimate" mortality groups.

Current mortality models do not capture the dynamics of the mortality embedded within the group. Although the average mortality increases for the group, it is not that every member of the group experiences slightly higher mortality. Many of the people underwritten as "preferred" three years ago would still qualify as "preferred" today. Their expected mortality is no different from a person underwritten for the first time today. The increased mortality is due to the decline of other people in the group. Some of the people who were preferred three years ago would qualify as "standard," "substandard" or even be "declined" today. The increase in mortality observed is a weighted average of the mortality across these different classes based on the percentage of the people who would now fall in those classes if underwritten today. As insurance companies cannot underwrite after issue, they are still classified as preferred in the contract, but they no longer would qualify if underwritten today. Over time, more and more people experience health problems that cause the mortality expectation to deviate from preferred, so the overall preferred mortality decreases as the group deteriorates over time.

As stated above, current mortality tables do not account for changes in underwriting class over time. Aspects of the inventive model do account for the changes in underwriting class explicitly instead of implicitly within the mortality rates. The overall mortality rates may still match the mortality observed from decades of research, but the composition of the underlying group makes a difference to the pricing of many future policies and policy features.

The improvements in the mortality tables provided by aspects of the present invention lead to smaller error terms and more accurate mortality estimates, which in turn yield supportable pricing and cost information. In older processes, large error terms and inaccurate data could easily negate any profit margin yielded by the option or product.

Because the mortality tables reflect the changes in underwriting class over time, pricing of the products that use the mortality tables is improved. The pricing better reflects and accounts for true future mortality. Underwriting is typically done only at issue, so a better understanding of how mortality changes over time is valuable for pricing and understanding mortality experience over time.

The improvements to pricing may affect a variety of life insurance products including (but not limited to): Term conversion, Projection of Guaranteed Issue mortality, projection of the impact of high lapse rates, and Guaranteed Insurability Option Riders (GIO Riders), among others.

A current issue in determining price and cost information related to various life insurance products is the identification of the percentage of people that will exercise a particular option (e.g., term conversion, guaranteed insurability, etc.). The improved mortality tables allow the user (e.g., a life insurance provider) to estimate utilization of the various options based on underwriting class rather than based on the population as a whole. Improved estimates of utilization result in improved pricing of options and insurance products.

As stated above, the improved mortality tables allow for better estimates of mortality, smaller error terms, and the ability to break down mortality data by underwriting class or risk category. Once the mortality data has been segmented into the underwriting class/risk category, each risk category can be tested and analyzed separately to ensure that the utilization, price, and cost information is accurate, which is an improvement over previous testing and analysis based on the population as a whole.

According to an embodiment of the invention, the process to improve mortality projections used within the model includes creating a progression table, which may also be referred to as a transition table. A person who starts as a preferred risk would have a probability of moving to any of 5 categories in any given year: staying preferred, or change to one of standard, substandard, decline or dead (a different number of categories may be used, based on need). A person who has been moved to a new category over time would have a different probability of subsequent status changes consistent with other people who are in that status. The process might not have a memory of past status, that is, a person who is standard in year 6 would be treated the same whether they used to be preferred, standard or substandard at issue. However, in other embodiments a person's historical status might be taken into account.

Figure 2:
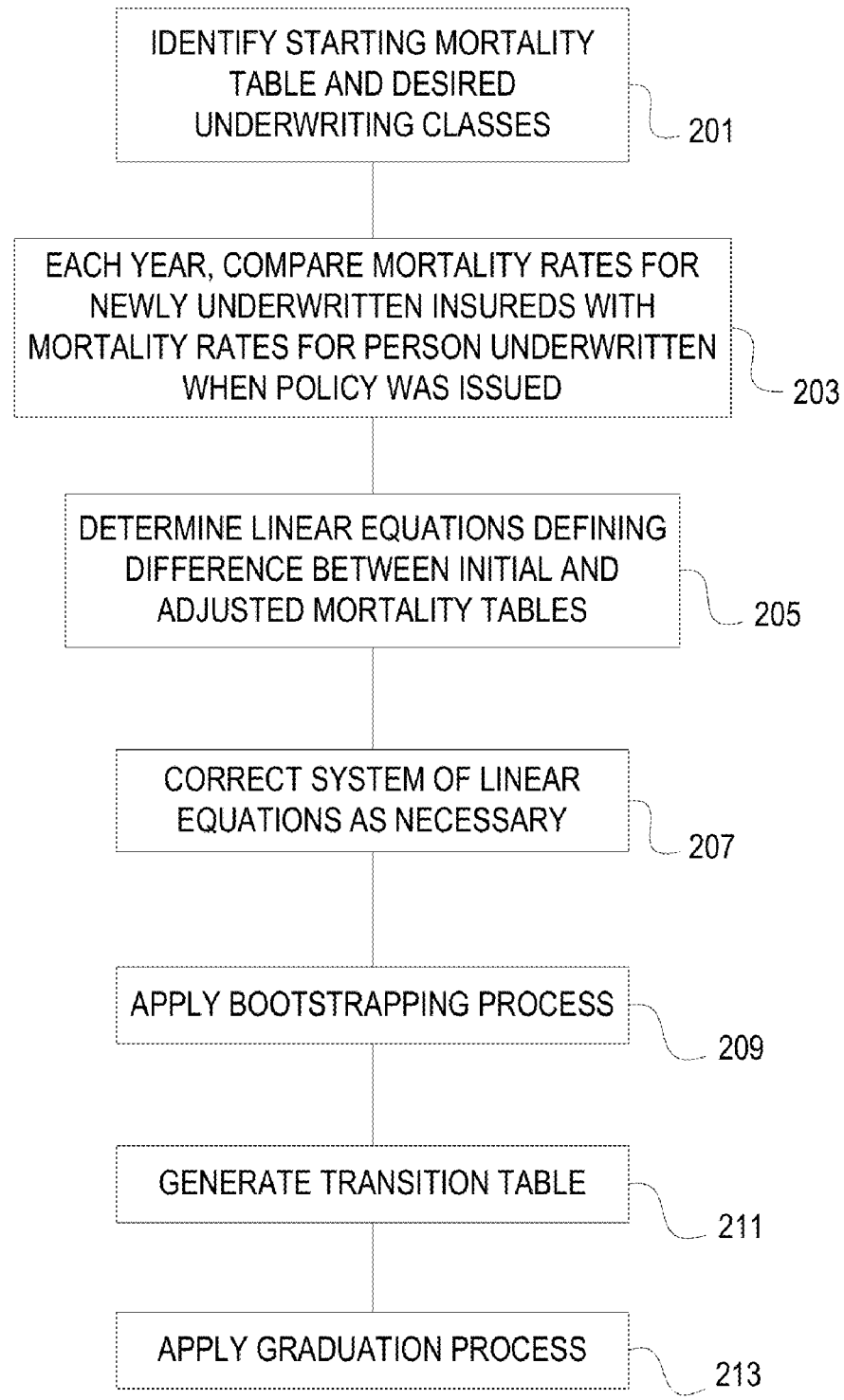
FIG. 2 illustrates a method for creating a mortality table according to one or more illustrative aspects of the invention.

An illustrative method for developing an improved mortality table is provided with reference to FIG. 2. In step 201, a user, e.g., e.g., a Fellow of the Society of Actuaries (FSA) whose duties include mortality analysis, starts with an existing/known mortality table. This table preferably includes select and ultimate mortality rates for each age and initial underwriting class. The improved mortality progression model typically includes the same underwriting classes as the standard table used as the benchmark for the development of the transition table (discussed below). This initial mortality table is created by analyzing the health and characteristics of each person on whom the table is based to determine the probability that the person will die before his or her next birthday, and averaging the data according to underwriting class. The mortality table can thus be thought of as a translation of a person's health into a quantifiable measure regarding the probability of death before their next birthday, or the year-to-year probability of death for the rest of his or her insured life. The translated measure thus provides an improved aggregate representation of mortality risk.

In step 203, for each underwriting class, each year of issue and each year of duration after issue, compare the mortality rate for a newly underwritten life with the mortality for a person underwritten when the policy was issued. The difference between these two rates is the additional mortality resulting from the change (generally deterioration) in the mortality since issue. As a result, the mortality for the aged group should be a weighted average of the mortality for the participants in the group as if newly underwritten. This creates a linear equation for each age/duration combination in which we are trying to determine the percentage of people in each current mortality group. These percentages are less than or equal to one and sum to one. These linear equations are not independent. The probability of a person moving from one underwriting class to another would be independent of the time since issue. Instead, it depends on the current underwriting class and age only. Therefore, there may be multiple times that a particular probability of transition appears in different equations. Stated differently, an individual's history is irrelevant. The probability that the individual will be in the same health, worse, or dead within one year is not impacted by how that individual got to his or her present state of health. The only relevant question is the probability that the individual will change health status within 1 year.

In step 205, the user creates a system of simultaneous equations, e.g., a system of linear equations, that incorporates all of these variables, and the system of equations may be represented in the new mortality tables. Depending on the number of underwriting classes and ages, there may be two issues that develop. First, the resulting equations may be inconsistent. In this case, in step 207 a least squares or other metric of fit should be applied and the transition table probabilities set to minimize the value of the metric. Keeping the total number of deaths consistent with the table is a priority in the optimization process. In addition, the progression of similar values such as the probability of moving from Standard to Table 2 should form a smooth pattern across the ages. Thus, as a person moves from one age to the next, the chance of having a health impairment should not swing wildly from one year to the next. Instead, the probability is expected to increase gradually as the person ages.

The second issue that may develop is that resulting equations may leave room for multiple solutions. The user in step 207 may apply his or her professional judgment to arrive at a solution. For example, data with regard to the distribution of people across the underwriting classes after 10 years might be applied by age to create an additional constraint. Also, some transitions might be determined using "rules of thumb" such as setting the probability of underwriting class improvement to zero or setting the probability of moving to a highly substandard underwriting class to a constant value. Alternatively, an additional formula may be imposed to assure smoothing of consistent values as mentioned with respect to resulting inconsistent equations, above.

In step 209, a bootstrapping process starting at the end of the mortality table and working toward the younger ages may be applied to construct the mortality table from the system of linear equations. At each new age, the transition tables for all later ages would have been set. This method might be easier to execute, but may require more work to the graduation process to create a smooth data set.

In step 211, a set of progression tables are generated that contain the probability of moving from any age and underwriting status to each underwriting status (or death) at the next age. Each progression table may correspond to a specified age within a specified underwriting class. Thus, there may one progression table for 40-year olds in the preferred underwriting class; one progression table for 41-year olds in the preferred underwriting class, one progression table for 40-year olds in the standard underwriting class; etc.

In step 213, a graduation process may be performed to assure that these values vary in a consistent manner across the ages if this was not a constraint imposed in the previous step. As with all graduations, this will require judgment (again, by one of ordinary skill in the art, such as an FSA with experience working with mortality tables) about the relative weight to give fit versus smoothness. Because the original mortality table may have been graduated using different criteria, the resulting values might not be smooth when judged by the new standards. The graduation process may need to be rigorous to create a reasonable set of data for the new mortality progression table.

In an example provided in FIG. 3 and FIG. 4, 10,000 people enter the process as the highest type of preferred risks. After 10 years, about 80% are still in the preferred range, nearly 10% standard risks, about 10% in the substandard range, 1-2% no longer insurable and about 1% dead. This is the result of the process working each year for 10 years and people gradually changing status. For example, the probability of remaining in the highest category is 95% each year. However, after 10 years of 5% leaving each year, the result is only 61% remaining in the status. (Note: while this example only uses five (5) status levels, other models may subdivide into more status levels, and/or the preferred and substandard levels may be further subdivided into more levels.)

The probability of death across the entire group should be consistent with traditional select and ultimate mortality tables. Also, the probability of death for a newly underwritten life under traditional methods should be the same as the probabilities of death for people who are determined to fall into that same category by this process. This creates many constraints to the process of solving for the transition table. A smoothing process that assumes that the transition factors change gradually and consistently from age to age is likely to allow a reliable model to be developed from available data.

FIG. 3 illustrates a sample mortality table according to aspects of the invention. FIG. 4 illustrates a sample transition table according to aspects of the invention. The mortality table in FIG. 3 does not adjust mortality for increasing age, just for underwriting class changes. FIG. 3 also assumes that the transition table shown in FIG. 4 is constant by age, however, it is possible that a transition table may differ by age. The transition table is preferably constant by underwriting class with the initial lives being the item that changes. For example, the initial lives could be all Preferred (P) instead of Preferred Elite (PE). In addition, mortality for a Guaranteed Issue (GI)/Simplified Issue (SI) group may be projected based on the mix of initial class. The S&U mortality rates may provide a touch-stone for the model because it needs to replicate those rates consistently.

The death rates in the transition table of FIG. 4 are those from the first year of a select table because they are assumed to apply to a person as if that person had been newly underwritten. The mortality rates that result from the model are the $q_{x+[d]}$ where d is the years from underwriting. The transition probability table may be unique by age and applied on an attained age basis. For example, if the table in FIG. 4 related an insured group that was age 40 in the initial year, the transition table for 41 may be applied in the second year, 42 in the third, etc. In addition to varying the mortality, the probabilities of "downgrade" may increase with age.

One or more aspects of the inventive transition/progression table(s) described herein and created using the above processes may be used to improve known mortality tables or may be used to provide better pricing based on a better approximation of progression dynamics. The following examples illustrate processes, systems, and products that may incorporate or benefit from using the improved mortality table(s).

Example 1

Term Conversion

Figure 5:
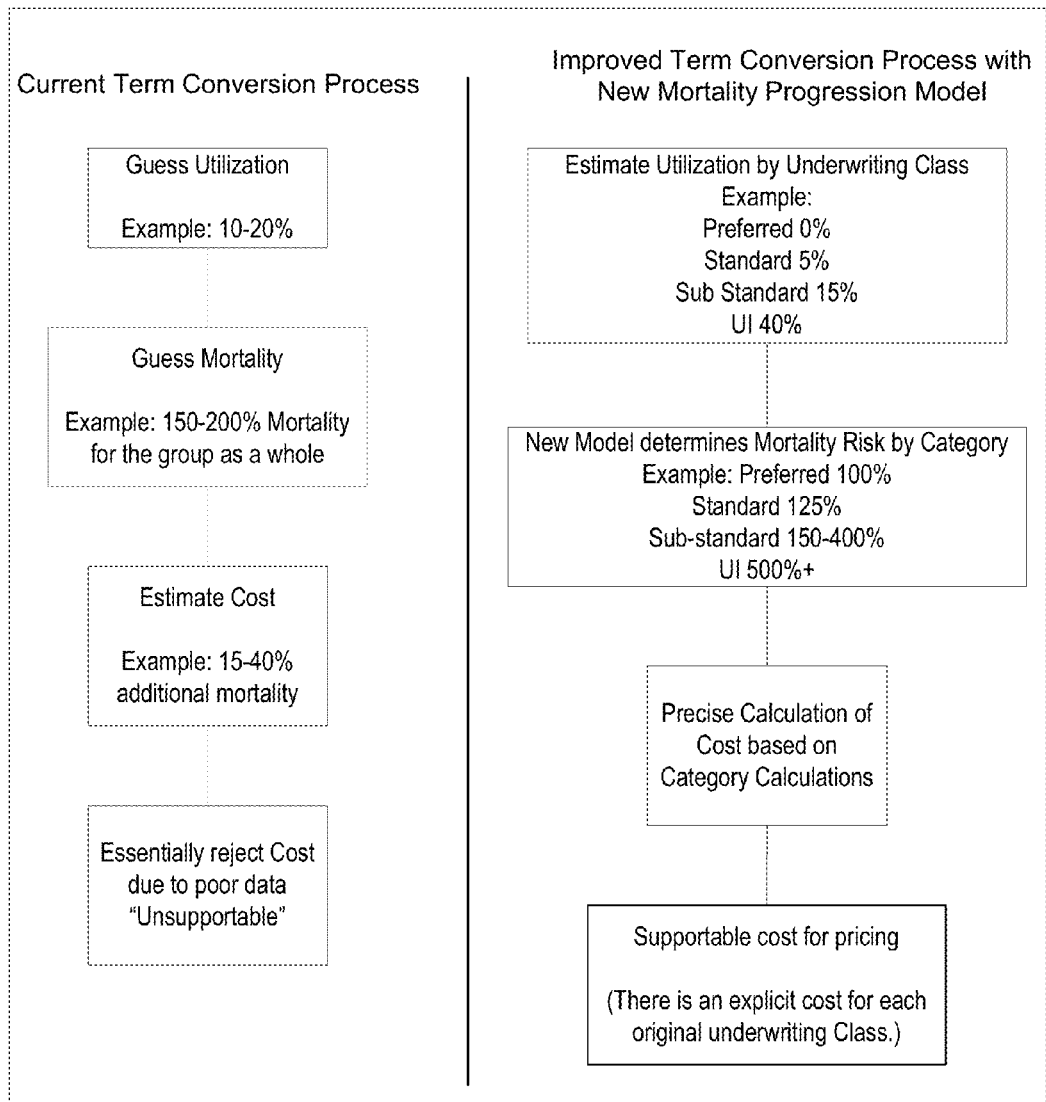
FIG. 5 illustrates a process of using the improved tables of FIG. 3 and FIG. 4 with a Term Conversion insurance policy according to one or more illustrative aspects of the invention.

FIG. 5 illustrates a prior art term conversion process on the left with an improved term conversation process according to aspects of the invention on the right. Term conversion is an important benefit within a term insurance product. Generally speaking, the owner of the policy has the right to exchange or convert that policy to a permanent life insurance policy on the same rate basis as the original policy within new underwriting. This allows them to extend what may have been a 20 year commitment to a rate basis to a lifetime commitment for the insurance company or insurance provider.

The current practice for term conversion is not explicit. The process involves estimation and broad ranges with high error margins. This process of estimation results in a cost estimate that is unsupportable due to lack of specific data. The improved mortality tables according to aspects of the invention increase the accuracy of the term conversion process. Smaller error terms and more accurate estimates yield a supportable pricing number. The improved process leads to a cost number that is supportable for each original underwriting class.

For example, if one examines a group of term insurance customers after 19 years, (a year before their term policy expires), focusing on the group that was classified as preferred, some of the people will still be preferred and the conversion option does not offer anything of value. Some customers will be standard and the term conversion option will have some value if those customers still have a need for life insurance, because those customers will be able to convert their policies as if they were still "preferred" status. However, for the substandard and decline categories, the conversion option will have so much value that it would be worth doing the conversion even if the person had no remaining need for life insurance. It is clear that a person pricing such a benefit would be able to do a better job if they could estimate the number of people who would be in each group after 19 years. The enhancements to the mortality tables make the pricing for term conversions much more accurate.

A problem with term conversion pricing is that the probability and cost of term conversion both vary with the health status of the insured. Today, the mortality models do not produce a distribution of lives in different health conditions, but only predict the aggregate mortality of the group. This leaves the actuary with only rough rules of thumb for calculating the cost of the feature.

The mortality progression model described herein produces an explicit distribution of lives into the various underwriting classes. From there, the actuary can apply probabilities suitable to each group for the probability of using the term conversion option. Also, the estimated cost (in excess claims) of term conversion can be calculated for each group. The result is that a cost of term conversions can be explicitly calculated from the model. Also, the cost of term conversion can be explicitly calculated for different initial underwriting groups. The cost for preferred lives can be expected to be different from the cost for insureds who start as standard risks.

In addition to pricing a particular group of insured lives, the mortality progression model allows the actuary to examine the cost of different types of term conversion offers. For example, some policies allow the insured to convert from a term policy to another type of policy. The offer to change policy types is typically bounded by a number of years. The longer the offer is outstanding to the insured, the more expensive it is to the insurance company making the offer as over a longer time horizon more insureds in a group will fall into poor health and exercise an option to convert a term policy to a more permanent type of policy. The improved mortality tables described herein allow actuaries to determine the cost of different lengths and types of term conversion offers. The mortality progression model also allows the actuary to see the impact of time on the number of people whose health would deteriorate and would benefit financially from a term conversion. Also, the relationship of the term conversion to the end of the level premium period can influence the utilization of the option. Finally, the term conversion can guarantee the original underwriting class or could provide for lesser guarantee of standard class conversion. The latter is common in group insurance and has a material impact on the cost and likelihood of conversion.

Example 2

Projection of Guaranteed Issue Mortality

Figure 6:
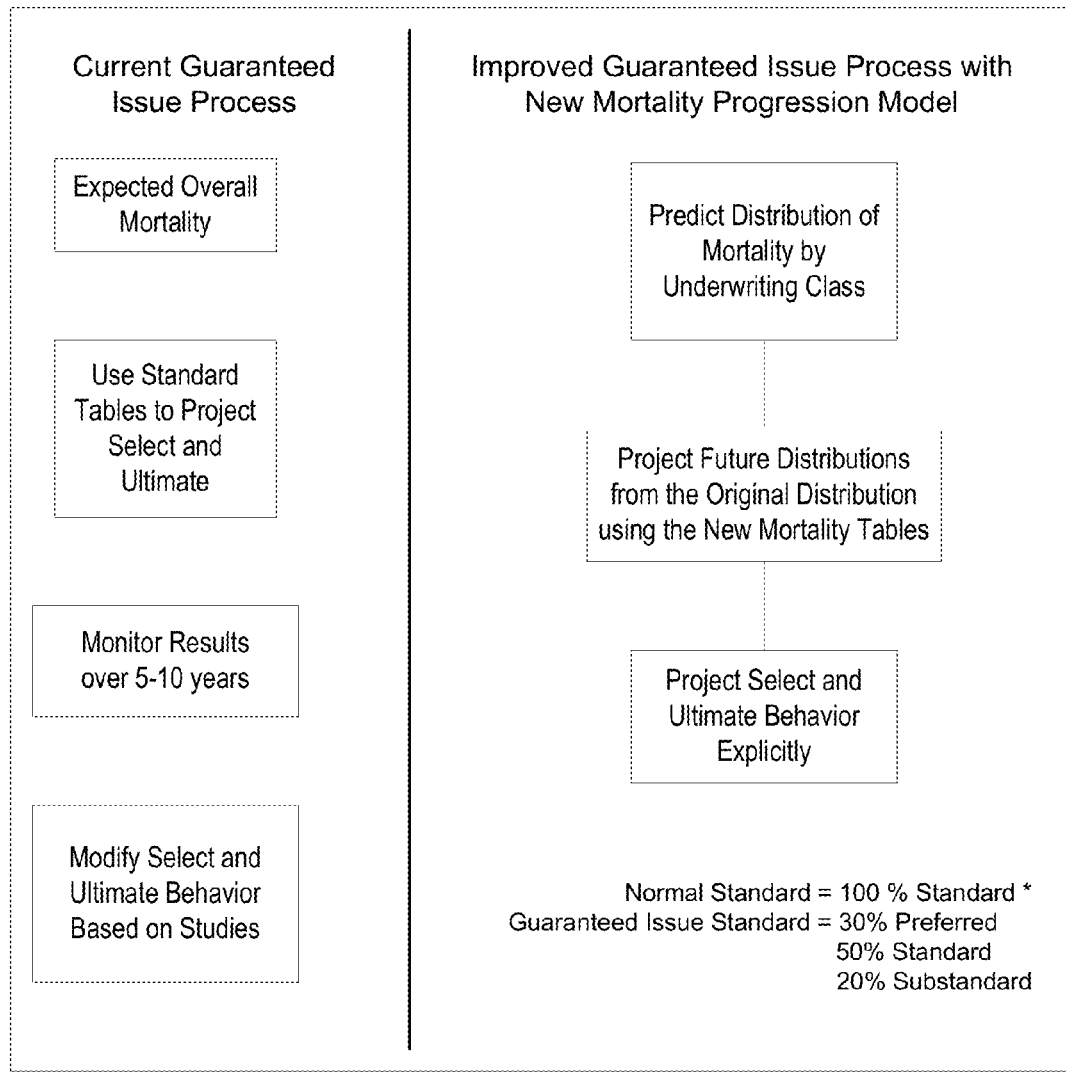
FIG. 6 illustrates a process of using the improved tables of FIG. 3 and FIG. 4 with a Guaranteed Issue insurance policy according to one or more illustrative aspects of the invention.

FIG. 6 illustrates a prior art Guaranteed Issue process on the left with an improved Guaranteed Issue process according to aspects of the invention on the right. When risks are taken across many different underwriting classes at issue, as is the case with guaranteed issue mortality, the trend in future mortality does not follow normal rules. This model takes the mix of people introduced at the beginning of the process and projects them forward as easily as it does for a block of regularly underwritten business.

Life insurers see different behaviors for normal standard versus guaranteed issue standard ("normal standard" and "guaranteed issue standard" are different levels of risk associated with an insured—other levels may alternatively be used). They have the same average mortality but the two groups behave differently over time. Currently Guaranteed Issue is rated based on Normal Standard which does not reflect the true make-up and behavior of the guaranteed issue standard. The improved mortality tables allow for more accurate price and cost information. Please see the following flow chart for a comparison of the old and improved processes.

Example 3

Projection of the Impact of High Lapse Rates

Figure 7:
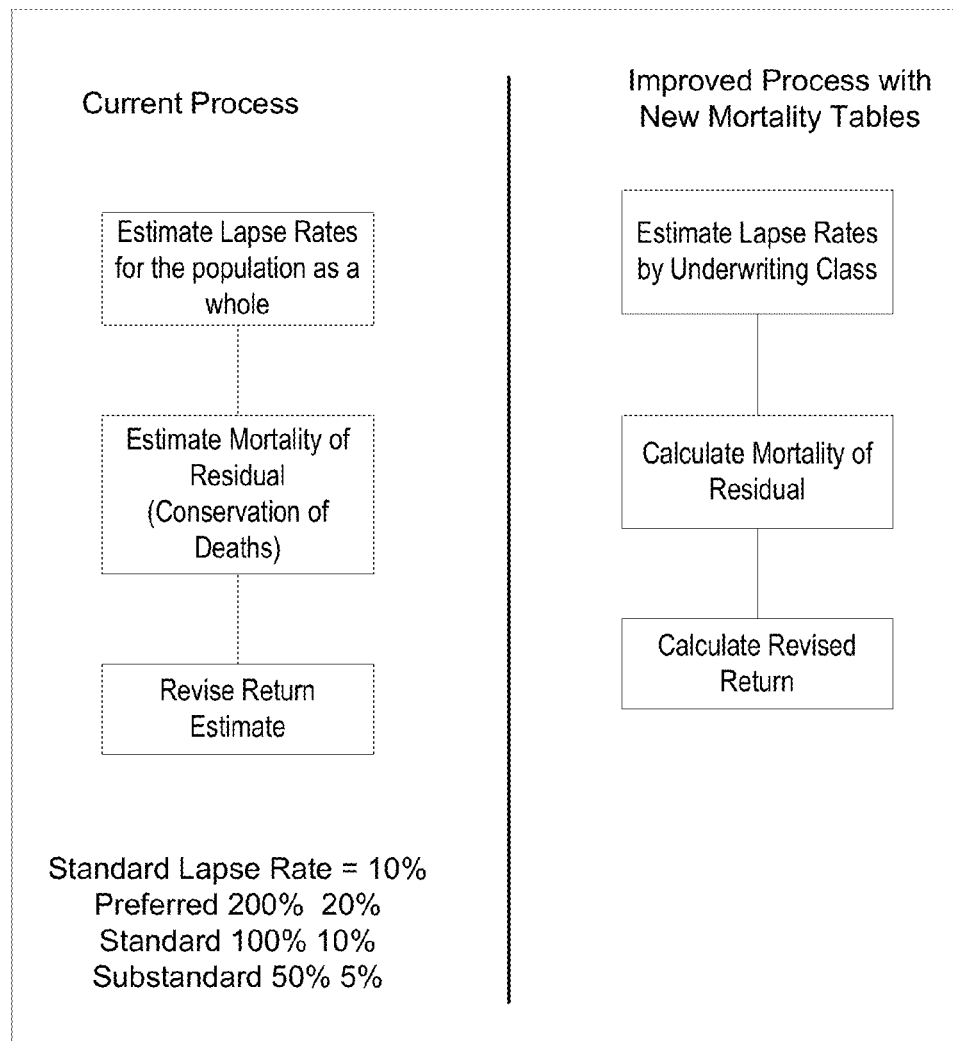
FIG. 7 illustrates a process of using the improved tables of FIG. 3 and FIG. 4 to determine Lapse Rates according to one or more illustrative aspects of the invention.

FIG. 7 illustrates a prior art high lapse rate process on the left with an improved high lapse rate process according to aspects of the invention on the right. It is known that high lapse rates tend to remove the better risks from a block of life insurance. Life actuaries are familiar with the general premise that healthier people lapse (i.e., surrendering a policy other than by dying) more quickly than less healthy people and generally each individual only lapses once. Over time lapse rates deteriorate. People who are healthy enough to easily change life insurance will take the opportunity to change insurance because it is relatively easy to obtain a different life insurance policy. People who are not healthy enough to get life insurance elsewhere typically remain with their existing policy longer. This means that the people that remain with a policy for a long time are less likely to let the policy lapse. After a few years the preferred class is extinct in that the healthy people have all moved on to other forms of insurance and the result is a higher mortality rate. Over time the group is skewed to the lower underwriting classes because they have less incentive or opportunity to leave to find other insurance. However, the improved model allows an actuary to apply lapse rates by underwriting class, retaining the people who are most likely to want to keep coverage by using lower lapse rates. As with the term conversion experience, this allows direct calculation of something that is done implicitly today. As time progresses and the group becomes skewed, the few extra uninsurable people in the group can materially change the pricing of the group. The improved mortality tables are used to account for this skew over time and will improve the error margins and estimates used in determining price and cost information.

Example 4

Guaranteed Insurability Option Riders

Figure 8:
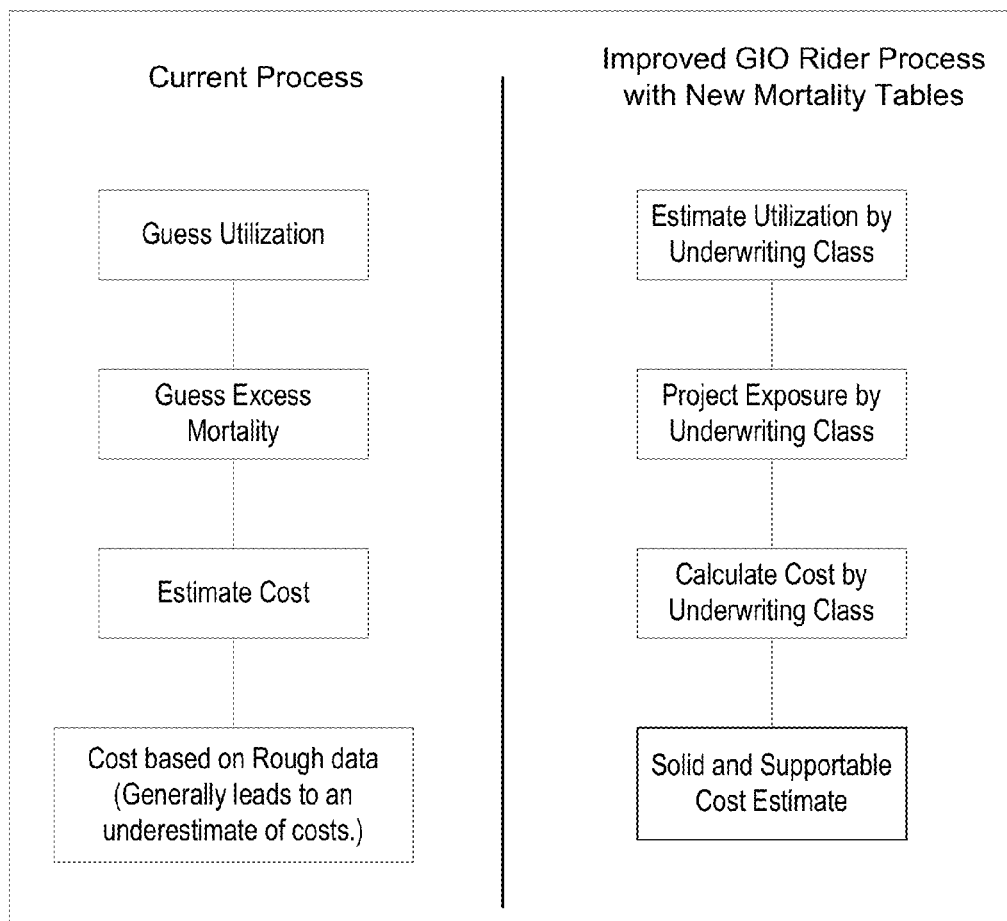
FIG. 8 illustrates a process of using the improved tables of FIG. 3 and FIG. 4 to generate a GIO Rider estimate according to one or more illustrative aspects of the invention.

FIG. 8 illustrates a prior art GIO Rider process on the left with an improved GIO Rider process according to aspects of the invention on the right. A Guaranteed Insurability Option (GIO) is the right of an insured to purchase additional coverage at the original rating. Generally, if the insured does not buy the additional coverage when it is offered, the insured cannot take additional coverage at a later point. Alternative embodiments might allow for the decline of an offered coverage. Some insureds may plan to buy the rider because they are on a schedule and not because they are ill; however, if an ill person were offered a rider of this type, it is typically in his or her best interest to accept additional coverage.

The current process for pricing these riders generally underestimates the cost of the riders because the cost is based on rough data and gross estimates. The improved mortality tables allow for better assumptions to be made and the ranges and error terms are smaller and in a better overall context. This improved model allows a direct calculation of mortality cost (i.e., present value of the death benefit) by calculating the distribution of people for whom this will be a better deal than they would be offered by later underwriting.

These are only four examples of uses for improved mortality and progression models as described herein. They demonstrate how an explicit understanding of a maturing block of insureds can allow a more detailed risk assessment for different types of situations. Without this type of tool, rough rules of thumb and/or experience data from the precise situation are the primary ways to get answers to these tough questions. Neither of these methods is timely or easily applied to new situations and both are subject to questionable accuracy in many cases.

Aspects of the invention may have application to other areas where selection is only done at the beginning of a process, not done at all, or done to a lesser extent later. Examples might include group life, individual or group health experience, individual or group auto, credit scoring and other areas where the risk assessment changes over time. In health insurance, the person who is sick will tend to keep a policy, stay in richer coverage options or elect COBRA coverage. In group life, people who are not insurable will tend to convert to individual coverage at termination. A current credit score is an indicator of future credit scores, but moves over time. Predicting the distribution of that movement may be meaningful to how to grant or restrict credit lines and charged interest rates.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer memory device storing computer executable instructions that, when executed by a processor, cause a computer to autonomously perform a cost analysis by:
   determining an original distribution of mortality for each of a plurality of underwriting classes of a plurality of people underwritten for a financial product;
   projecting a future distribution of mortality corresponding to each original distribution based on a predetermined set of progression tables that model an expected movement of insureds from one underwriting class to another over time;
   analyzing the projected future distributions of mortality to predict a percentage of insureds in each underwriting class likely to accept a product offering associated with the financial product; and
   generating a cost for the product offering based on the predicted percentages of insureds in each underwriting class likely to accept the product offering.

2. The computer memory device of claim 1, wherein the financial product comprises life insurance.

3. The computer memory device of claim 2, wherein the product offering is guaranteed insurability option rider.

4. The computer memory device of claim 2, wherein the product offering is a term conversion of the life insurance.

5. The computer memory device of claim 1, wherein the predetermined set of progression tables is generated by:
   identifying an expected mortality based on an underwriting class for people of a same age that have recently been underwritten for life insurance;
   analyzing actual death claims to identify actual mortality of the people at a predetermined point in the future;
   determining a difference in mortality between the actual mortality at the predetermined point in the future and an expected mortality as if the people were newly underwritten at that predetermined point in the future, wherein a portion of the people have experienced a deterioration in health since original underwriting of life insurance such that their mortality will be higher at the predetermined point in the future than would otherwise be expected had their health not deteriorated;
   repeating the identifying, analyzing, and determining steps for each of a plurality of ages, underwriting classes, and for multiple different predetermined points in the future;
   creating a system of equations, based on the determined differences in mortality, that model the expected movement of insureds from one underwriting class to another over time to explain the observed differences in mortality; and
   generating the predetermined set of progression tables based on the system of equations.

6. A method for calculating a cost of a life insurance product, comprising:
   determining, by a computer, an original distribution of mortality for each of a plurality of underwriting classes of a plurality of people underwritten for individual life insurance;
   projecting, by the computer, a future distribution of mortality corresponding to each original distribution based on a predetermined set of progression tables that model an expected movement of insureds from one underwriting class to another over time;
   analyzing, by the computer, the projected future distributions of mortality to predict a percentage of insureds in each underwriting class likely to accept a product offering associated with the financial product; and
   generating, by the computer, a cost for the product offering based on the predicted percentages of insureds in each underwriting class likely to accept the product offering.

7. The method of claim 6, wherein the product offering is a guaranteed insurability option rider.

8. The method of claim 6, wherein the product offering is a term conversion of the life insurance.

* * * * *